United States Patent
Kim et al.

(10) Patent No.: US 8,801,057 B2
(45) Date of Patent: Aug. 12, 2014

(54) BUMPER STRUCTURE OF CLEANING ROBOT

(75) Inventors: Jeong Hun Kim, Suwon-si (KR); Yong Jae Kim, Seoul (KR); Youn Baek Lee, Suwon-si (KR); Heum Yong Park, Suwon-si (KR); Kyung Shik Roh, Seongnam-si (KR); Young Do Kwon, Yongin-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 406 days.

(21) Appl. No.: 13/317,412

(22) Filed: Oct. 18, 2011

(65) Prior Publication Data
US 2012/0126837 A1    May 24, 2012

(30) Foreign Application Priority Data
Oct. 27, 2010 (KR) ........................ 10-2010-0105097

(51) Int. Cl.
*B60R 19/00* (2006.01)
*B60R 21/0136* (2006.01)

(52) U.S. Cl.
CPC ................................. *B60R 21/0136* (2013.01)
USPC ............................................................. 293/4

(58) Field of Classification Search
CPC ............................. B60R 19/483; C08L 53/00
USPC ............ 293/4, 102, 120, 121, 132, 134, 135, 293/136; 180/274; 267/139
See application file for complete search history.

(56) References Cited

U.S. PATENT DOCUMENTS

| | | | |
|---|---|---|---|
| 4,951,985 A * | 8/1990 | Pong et al. ..................... | 293/102 |
| 7,480,960 B2 * | 1/2009 | Kim ................................ | 15/325 |
| 7,620,476 B2 * | 11/2009 | Morse et al. .................. | 700/245 |
| 7,761,954 B2 * | 7/2010 | Ziegler et al. .................. | 15/320 |
| 8,209,053 B2 * | 6/2012 | Kim et al. ....................... | 700/245 |
| 8,380,350 B2 * | 2/2013 | Ozick et al. ................... | 700/253 |
| 8,382,906 B2 * | 2/2013 | Konandreas et al. ............ | 134/6 |
| 8,387,193 B2 * | 3/2013 | Ziegler et al. .................. | 15/50.1 |
| 8,392,021 B2 * | 3/2013 | Konandreas et al. ......... | 700/245 |
| 8,584,305 B2 * | 11/2013 | Won et al. ....................... | 15/319 |
| 8,584,307 B2 * | 11/2013 | Won et al. ....................... | 15/319 |
| 8,598,829 B2 * | 12/2013 | Landry et al. ................. | 318/587 |
| 8,606,401 B2 * | 12/2013 | Ozick et al. ................... | 700/253 |
| 8,671,507 B2 * | 3/2014 | Jones et al. ..................... | 15/319 |
| 2004/0187249 A1 * | 9/2004 | Jones et al. ..................... | 15/319 |
| 2007/0244610 A1 * | 10/2007 | Ozick et al. ..................... | 701/23 |
| 2008/0091304 A1 * | 4/2008 | Ozick et al. ................... | 700/258 |
| 2008/0140255 A1 * | 6/2008 | Ziegler et al. ................. | 700/245 |

(Continued)

*Primary Examiner* — Kiran B Patel
(74) *Attorney, Agent, or Firm* — Staas & Halsey LLP (57) ABSTRACT

A bumper structure of a cleaning robot which detects whether or not an obstacle contacts a bumper and a position of the obstacle, allows the bumper to be simply process and reduces the number of components of the cleaning robot to lower the production costs of the cleaning robot. The bumper structure includes a main body, a bumper installed on the front surface of the main body, a resistance film provided between the main body and the bumper and fixed to the main body, and a metal film provided between the main body and the bumper and fixed to the bumper such that the shape of the metal film is deformed together with the bumper and the metal film comes into contact with the resistance film when at least one obstacle contacts the bumper, so as to measure resistance values.

6 Claims, 10 Drawing Sheets

(56) References Cited

U.S. PATENT DOCUMENTS

| | | | |
|---|---|---|---|
| 2008/0276408 A1* | 11/2008 | Gilbert et al. | 15/320 |
| 2011/0278082 A1* | 11/2011 | Chung et al. | 180/167 |
| 2012/0036659 A1* | 2/2012 | Ziegler et al. | 15/50.1 |
| 2013/0241217 A1* | 9/2013 | Hickey et al. | 293/117 |
| 2013/0324004 A1* | 12/2013 | Schwartz | 446/259 |
| 2014/0026354 A1* | 1/2014 | Won et al. | 15/347 |

* cited by examiner

BUMPER STRUCTURE OF CLEANING ROBOT

CROSS-REFERENCE TO RELATED APPLICATIONS

This application claims the benefit of Korean Patent Application No. 2010-0105097, filed on Oct. 27, 2010 in the Korean Intellectual Property Office, the disclosure of which is incorporated herein by reference.

BACKGROUND

1. Field

Embodiments of the present disclosure relate to a bumper structure of a cleaning robot which detects a position of an obstacle.

2. Description of the Related Art

In general, cleaning robots are apparatuses which remove dust accumulated on a floor while autonomously traveling about a target region to be cleaned without user's manipulation.

A bumper installed on the front surface of a cleaning robot has a structure using a micro switch and a spring.

In the above the cleaning robot having the bumper structure including the micro switch and the spring, even if the position of the bumper structure is changed due to contact with an obstacle, the micro switch is not pressed and thus the cleaning robot may fail to recognize contact with the obstacle. Further, the bumper structure has poor resolution and thus the cleaning robot may fail to recognize a position of the obstacle contacting the bumper.

SUMMARY

Therefore, it is an aspect of the present disclosure to provide a bumper structure of a cleaning robot which detects whether or not an obstacle contacts a bumper and a position of the obstacle.

It is another aspect of the present disclosure to provide a bumper structure of a cleaning robot in which a bumper is simply processed and the number of components of the cleaning robot is reduced to lower the production costs of the cleaning robot.

Additional aspects of the disclosure will be set forth in part in the description which follows and, in part, will be apparent from the description, or may be learned by practice of the disclosure.

In accordance with one aspect of the present disclosure, a bumper structure of a cleaning robot includes a main body, a bumper installed on the front surface of the main body, a resistance film provided between the main body and the bumper and fixed to the main body, and a metal film provided between the main body and the bumper and fixed to the bumper such that the shape of the metal film is deformed together with the bumper and the metal film comes into contact with the resistance film when at least one obstacle contacts the bumper, so as to measure resistance values.

The bumper may be made of a flexible material.

The bumper may be attached to the main body through snap-fit connection.

The resistance film may be attached to the main body such that a length of the left portion of the resistance film and a length of the right portion of the resistance film with respect to the center of the front surface of the main body are equal.

The metal film may be conductive.

The metal film may be flexible.

The metal film may come into contact with the resistance film when the at least one obstacle contacts the bumper, so as to detect whether or not the at least one obstacle contacts the bumper and a position of the at least one obstacle.

In accordance with another aspect of the present disclosure, a bumper structure of a cleaning robot includes a main body provided with a connection groove, a bumper provided with a fixing part and installed on the front surface of the main body, a resistance film provided between the main body and the bumper and fixed to the main body, and a metal film provided between the main body and the bumper and fixed to the bumper, wherein the bumper is connected to the main body by inserting the fixing part of the bumper into the connection groove of the main body and a contact space is formed between the resistance film fixed to the main body and the metal film fixed to the bumper.

The bumper may be made of a flexible material.

The bumper may be attached to the main body through snap-fit connection.

The resistance film may be attached to the main body such that a length of the left portion of the resistance film and a length of the right portion of the resistance film with respect to the center of the front surface of the main body are equal.

The metal film may be conductive.

The metal film may be flexible.

The metal film may come into contact with the resistance film when at least one obstacle contacts the bumper, so as to detect whether or not the at least one obstacle contacts the bumper and a position of the at least one obstacle.

In accordance with a further aspect of the present disclosure, a bumper structure of a cleaning robot includes a main body, a bumper installed on the front surface of the main body, a resistance film provided between the main body and the bumper and fixed to the main body, and a metal film provided between the main body and the bumper and fixed to the bumper, wherein a contact space is formed between the resistance film fixed to the main body and the metal film fixed to the bumper, the metal film comes into contact with the resistance film when at least one obstacle contacts the bumper, so as to measure resistance values based on a generated voltage difference, and the metal film at the contact portion thereof with the at least one obstacle comes into contact with the resistance film, has been separated from the metal film by the contact space formed between the resistance film and the metal film, when the at least one obstacle contacts the bumper, so as to detect a position of the at least one obstacle using the measured resistance values.

The bumper may be made of a flexible material.

The bumper may be attached to the main body through snap-fit connection.

The resistance film may be attached to the main body such that a length of the left portion of the resistance film and a length of the right portion of the resistance film with respect to the center of the front surface of the main body are equal.

The metal film may be conductive.

The metal film may be flexible.

When an obstacle contacts the bumper, the metal film at the contact portion thereof with the obstacle may come into contact with the resistance film, has been separated from the metal film by the contact space formed between the resistance film and the metal film, and a resistance value measured at the left side with respect to the contact portion of the bumper with the obstacle may be defined as a first resistance value and a resistance value measured at the right side with respect to the contact portion of the bumper with the obstacle may be defined as a second resistance value.

The sum total of the first resistance value and the second resistance value may be equal to 1 corresponding to the overall resistance value of the resistance film.

A position of the obstacle contacting the bumper may be detected using a ratio of the first resistance value and the second resistance value.

When two obstacles contact the bumper, the metal film at the respective contact portions thereof with the two obstacles may come into contact with the resistance film, has been separated from the metal film by the contact space formed between the resistance film and the metal film, and a resistance value measured at the left side with respect to the contact portion of the bumper with one obstacle among the two obstacles closer to the left end of the bumper may be defined as a first resistance value and a resistance value measured at the right side with respect to the contact portion of the bumper with the other obstacle among the two obstacles closer to the right end of the bumper may be defined as a second resistance value.

When the two obstacles contact the bumper, the sum total of the first resistance value and the second resistance value may be less than 1 corresponding to the overall resistance value of the resistance film and positions of the obstacles contacting the bumper may be detected using the first resistance value and the second resistance value.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Reference will now be made in detail to the embodiments of the present disclosure, examples of which are illustrated in the accompanying drawings, wherein like reference numerals refer to like elements throughout.

Figure 1:
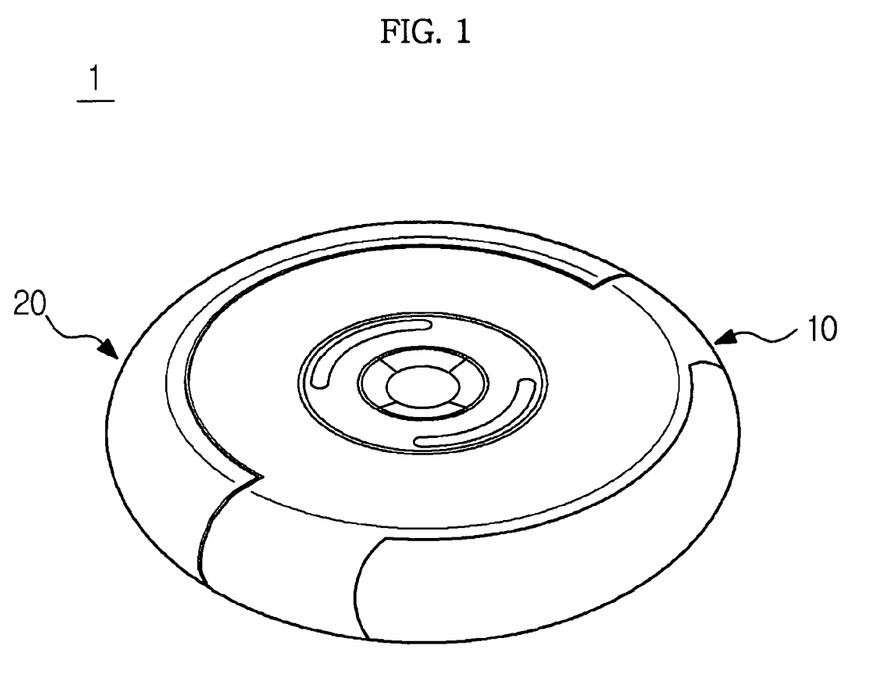
FIG. 1 is a perspective view of a cleaning robot in accordance with one embodiment of the present disclosure.

FIG. 1 is a perspective view of a cleaning robot in accordance with one embodiment of the present disclosure.

As shown in FIG. 1, a cleaning robot 1 in accordance with the embodiment of the present disclosure includes a main body 10 and a bumper 20 installed on the front surface of the main body 10.

A drive device (not shown), a cleaning device (not shown) and a controller (not shown) may be provided on the main body 10 of the cleaning robot 1.

The drive device (not shown) is a drive mechanism which is mounted on the main body 10 to drive the cleaning robot 1.

The cleaning device (not shown) is a cleaning mechanism which is mounted on the main body 10 to clean a floor under the cleaning robot 1 and surroundings thereof.

The controller (not shown) provides instructions to components of the cleaning robot 1 based on signals from a sensor and so on, thereby allowing the cleaning robot 1 to autonomously clean the floor.

The bumper 20 installed on the front surface of the main body 10 serves to sense an obstacle W (see FIGS. 5-10), such as a wall, or to perform a shock absorbing function when the obstacle W collides with the bumper 20.

Figure 2:
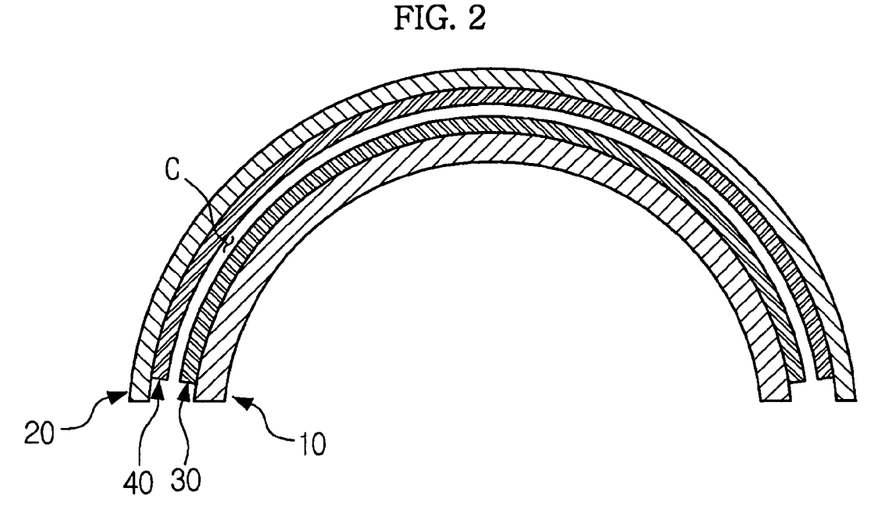
FIG. 2 is a view schematically illustrating a bumper structure of the cleaning robot in accordance with the embodiment of the present disclosure.
Figure 3:
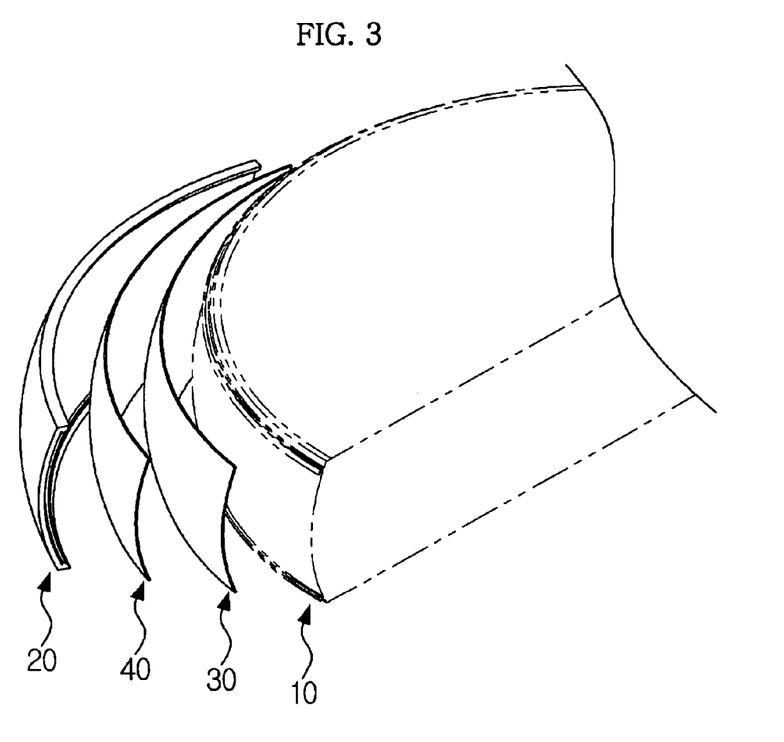
FIG. 3 is a perspective view of the bumper structure of the cleaning robot in accordance with the embodiment of the present disclosure.
Figure 4:
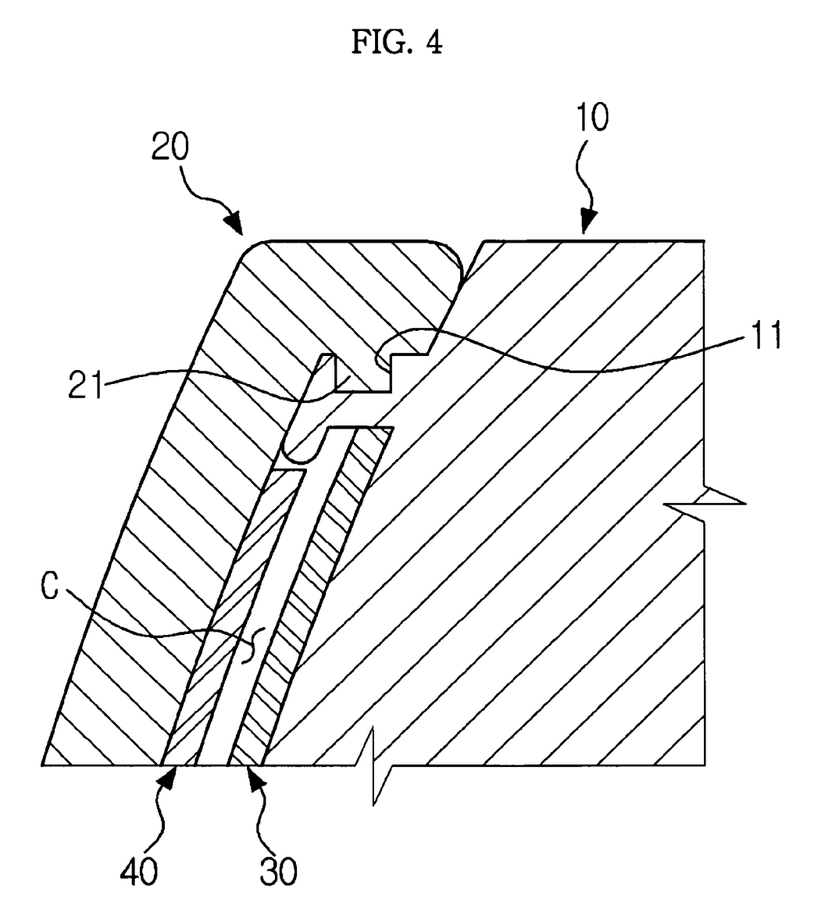
FIG. 4 is a cross-sectional view of the bumper structure of the cleaning robot in accordance with the embodiment of the present disclosure.

As shown in FIGS. 2 to 4, the bumper 20 of the cleaning robot 1 in accordance with the embodiment of the present disclosure has a structure in which a resistance film 30 and a metal film 40 are interposed between the main body 10 of the cleaning robot 1 and the bumper 20 installed on the front surface of the main body 10.

The bumper 20 installed on the front surface of the main body 20 of the cleaning robot 1 is made of a flexible material, and is attached directly to the main body 10 through snap-fit connection.

In order to attach the bumper 20 directly to the main body 10, a connection groove 11 is formed on the main body 10 and a fixing part 21 is formed on the bumper 20.

The fixing part 21 formed on the bumper 20 is inserted directly into the connection groove 11 formed on the main body 10.

When the bumper 20 is installed on the main body 10, the fixing part 21 formed on the main body 20 is inserted into the connection groove 11 formed on the main body 10, thereby simply connecting the bumper 20 to the main body 10.

The bumper 20 is connected directly to the main body 10 without any separate spring or guide for assembly, thereby reducing the number of components of the cleaning robot 1.

The resistance film 30 and the metal film 40 are interposed between the main body 10 and the bumper 20 of the cleaning robot 1.

The resistance film 30 is fixed directly to the main body 10 of the cleaning robot 1.

By fixing the resistance film 30 directly to the main body 10, the metal film 40 fixed to the bumper 20, which will be described below, comes into contact with the resistance film 30 when an obstacle W contacts the bumper 20, thereby allowing whether or not the obstacle W contacts the bumper 20 to be recognized.

When the resistance film 30 is fixed to the main body 10 of the cleaning robot 1, the resistance film 30 may be attached to the main body 10 such that a length of the left portion of the resistance film 30 and a length of the right portion of the resistance film 30 with respect to the center of the front surface of the main body 10 are equal.

However, attachment of the resistance film 30 is not limited to the above manner, and a method of calculating resistance values may be varied according to how the resistance film 30 is attached to the main body 10.

The resistance film 30 has the overall resistance value R of 1, and the position of the obstacle W contacting the bumper 20 is detected using a ratio of resistance values measured due to a voltage difference generated by contact between the metal film 40 and the resistance film 30 when the obstacle W contacts the bumper 20.

Among the measured resistance values, a resistance value measured at the left side with respect to an area which the obstacle W contacts is referred to as a first resistance value R1, and a resistance value measured at the right side with respect to the area is referred to as a second resistance value R2.

The resistance film 30 is configured such that the sum total of the first resistance value R1 and the second resistance value R2 becomes 1, thereby detecting the position of the obstacle W contacting the bumper 20 using the ratio of the first resistance value R1 and the second resistance value R2.

The metal film 40 is fixed directly to the bumper 20 of the cleaning robot 1, and is flexible.

Although the drawings illustrate that the resistance film 30 is fixed to the main body 10 of the cleaning robot 1 and the metal film 40 is fixed to the bumper 20 of the cleaning robot 1, the resistance film 30 may be fixed to the bumper 20 of the cleaning robot 1 and the metal film 40 may be fixed to the main body 10 of the cleaning robot 1.

Since the bumper 20 and the metal film 40 of the cleaning robot 1 are flexible, the bumper 20 and the metal film 40 exhibit a shock absorbing function and shapes of the bumper 20 and the metal film 40 at an area which the obstacle W contacts are deformed, when the obstacle W contacts the bumper 20, thereby allowing the metal film 40 to come into contact with the resistance film 30.

Further, since the metal film 40 is conductive, the shape of the metal film 40 is deformed and the metal film 40 contacts the resistance film 30 so that resistance values are measured, when the obstacle W contacts the bumper 20, thereby detecting whether or not the obstacle W contacts the bumper 20 and the position of the obstacle W.

The main body 10 and the bumper 20 of the cleaning robot 1 are directly connected under the condition that the resistance film 30 provided between the main body and the bumper 20 of the cleaning robot 1 is fixed to the main body 10 of the cleaning robot 1 and the metal film 40 provided between the main body 10 and the bumper 20 of cleaning robot 1 is fixed to the bumper 20 of the cleaning robot 1, thereby forming a contact space C between the resistance film 30 and the metal film 40.

The contact space C formed between the resistance film 30 and the metal film 40 allows the resistance film 30 and the metal film 40 to be separated from each other by a designated interval when the obstacle W does not contact the bumper 20, and then causes the metal film 40 fixed to the bumper 20 to be pressed and thus to contact the resistance film 30 when the obstacle W contacts the bumper 20.

Multimeters (not shown) are respectively connected to both ends of the resistance film 30 fixed to the main body 10 of the cleaning robot 1 and the metal film 40 fixed to the bumper 20.

Since the multimeters (not shown) are connected to both ends of the resistance film 30 and the metal film 40, when the resistance film 30 and the metal film 40 contact each other due to contact of the obstacle W with the bumper 20, current flows and a voltage difference occurs, thereby enabling resistance values to be measured.

Hereinafter, with reference to FIGS. 5 to 10, states in which an obstacle(s) W contact(s) the cleaning robot 1 having the bumper 20 in accordance with the present disclosure at various positions, respectively will be described.

Figure 5:
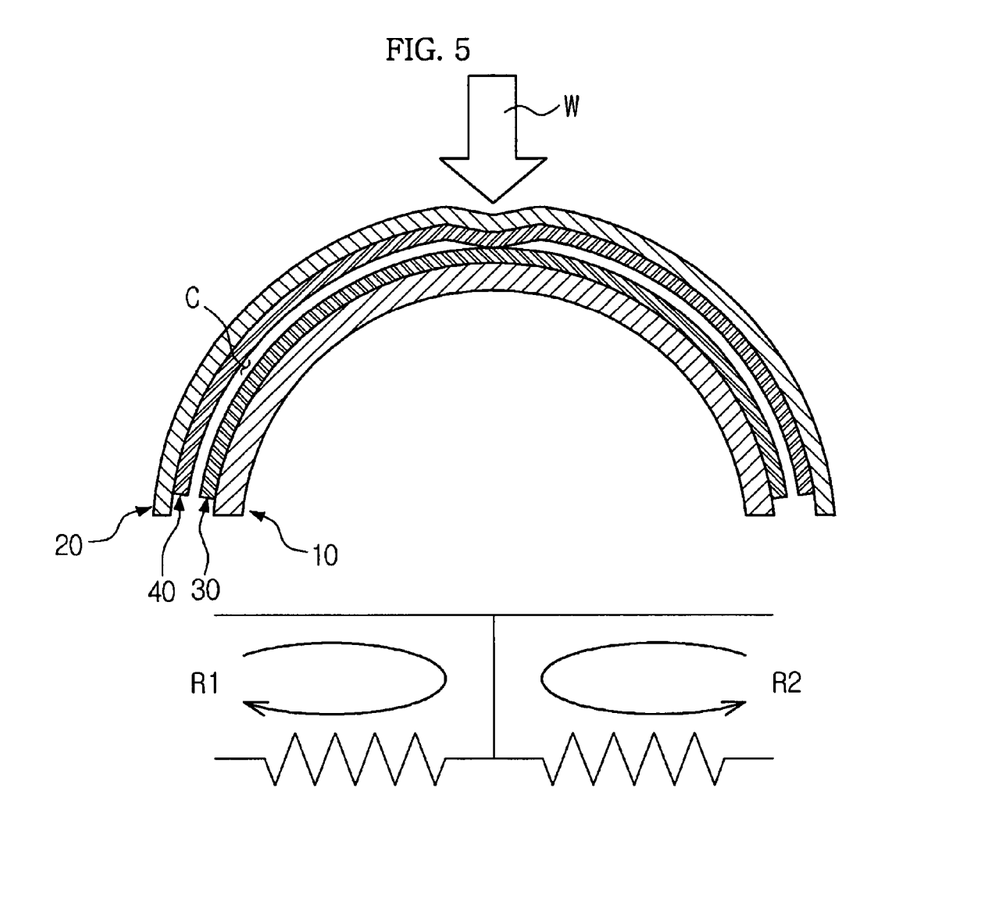
FIGS. 5 to 10 are views illustrating states in which an obstacle(s) contact(s) the cleaning robot having the bumper structure in accordance with the present disclosure at various positions, respectively.

As shown in FIG. 5, when an obstacle W contacts the central portion of the bumper 20, the shape of the central portion of the bumper 20, which the obstacle W contacts, is deformed and the shape of the metal film 40 fixed to the bumper 40 is deformed together with the central portion of the bumper 20.

The metal film 40 fixed to the bumper 20 and the resistance film 30 fixed to the main body 10 are separated from each other by the contact space S formed between the metal film 40 and the resistance film 30, and then, when the obstacle W contacts the central portion of the bumper 20, the shape of the metal film 40 at the central portion of the bumper 20 is deformed and the metal film 40 comes into contact with the resistance film 30.

When the metal film 40 and the resistance film 30 contact each other, the metal film 40, the resistance film 30 and the multimeters (not shown) are connected, a voltage difference between the left ends and the right ends of the metal film 40 and the resistance film 30 occurs, and resistance values are measured based on the voltage difference.

Here, when the resistance value measured at the left side with respect to the portion of the bumper 20 which the obstacle W contacts, i.e., the first resistance value R1, and the resistance value measured at the right side with respect to the portion of the bumper 20 which the obstacle W contacts, i.e., the second resistance value R2, are compared, the sum total of the first resistance value R1 and the second resistance value R2 is equal to the overall resistance value R of the resistance film 30, i.e., 1, and the first resistance value R1 and the second resistance value R2 are equal.

If the sum total of the first resistance value R1 and the second resistance value R2 is equal to the overall resistance value R, i.e., 1, of the resistance film 30 and the first resistance value R1 and the second resistance value R2 are equal, as described above, it is recognized that the obstacle W contacts the central portion of the bumper 20 and thus the position of the obstacle W contacting the bumper 20 is detected.

Figure 6:
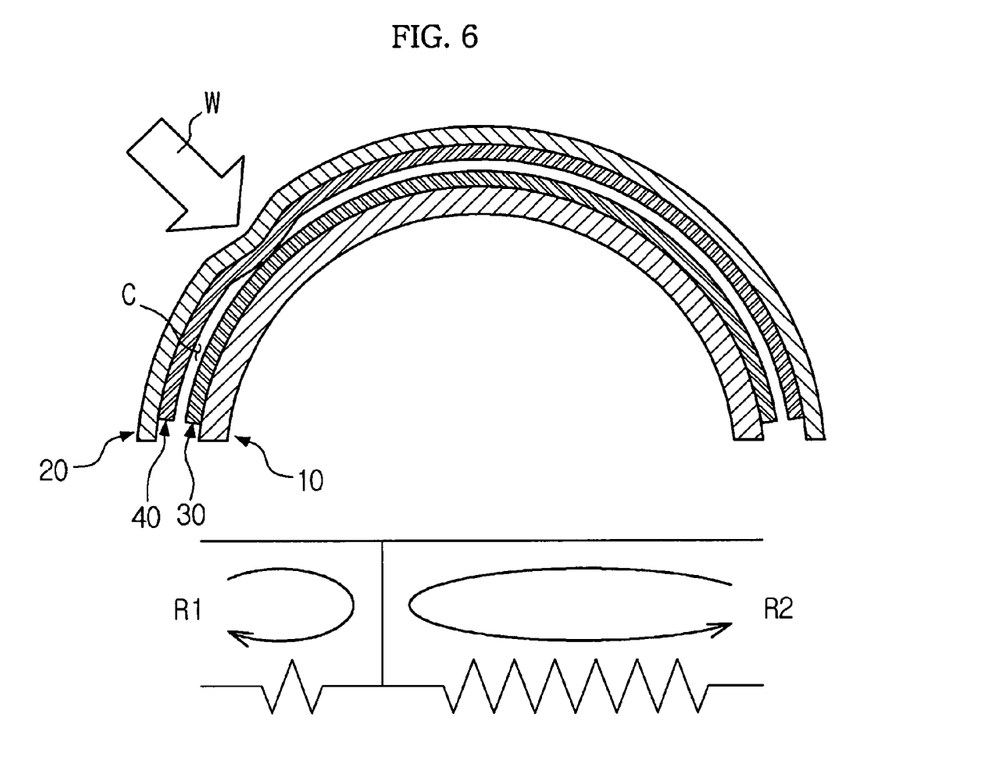

As shown in FIG. 6, when an obstacle W contacts the left portion of the bumper 20, the shape of the left portion of the bumper 20, which the obstacle W contacts, is deformed and the shape of the metal film 40 fixed to the bumper 40 is deformed together with the left portion of the bumper 20.

The metal film 40 fixed to the bumper 20 and the resistance film 30 fixed to the main body 10 are separated from each other by the contact space S formed between the metal film 40 and the resistance film 30, and then, when the obstacle W contacts the left portion of the bumper 20, the shape of the metal film 40 at the left portion of the bumper 20 is deformed and the metal film 40 comes into contact with the resistance film 30.

When the metal film 40 and the resistance film 30 contact each other, the metal film 40, the resistance film 30 and the multimeters (not shown) are connected, a voltage difference between the left ends and the right ends of the metal film 40 and the resistance film 30 occurs, and resistance values are measured based on the voltage difference.

Here, when the resistance value measured at the left side with respect to the portion of the bumper 20 which the obstacle W contacts, i.e., the first resistance value R1, and the resistance value measured at the right side with respect to the portion of the bumper 20 which the obstacle W contacts, i.e., the second resistance value R2, are compared, the sum total of the first resistance value R1 and the second resistance value R2 is equal to the overall resistance value R, i.e., 1, of the resistance film 30 and the second resistance value R2 is greater than the first resistance value R1.

If the sum total of the first resistance value R1 and the second resistance value R2 is equal to the overall resistance value R of the resistance film 30, i.e., 1, and the second resistance value R2 is greater than the first resistance value R1, as described above, it is recognized that the obstacle W contacts the left portion of the bumper 20 and thus the position of the obstacle W contacting the bumper 20 is detected.

Figure 7:
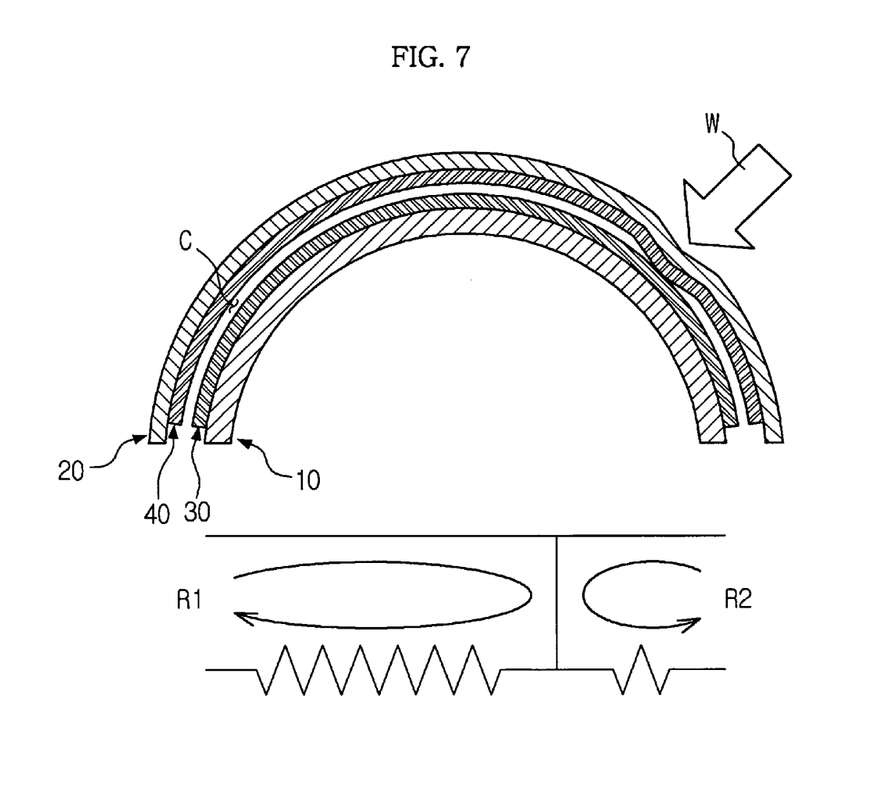

As shown in FIG. 7, when an obstacle W contacts the right portion of the bumper 20, the shape of the right portion of the bumper 20, which the obstacle W contacts, is deformed and the shape of the metal film 40 fixed to the bumper 40 is deformed together with the right portion of the bumper 20.

The metal film 40 fixed to the bumper 20 and the resistance film 30 fixed to the main body 10 are separated from each other by the contact space S formed between the metal film 40 and the resistance film 30, and then, when the obstacle W contacts the right portion of the bumper 20, the shape of the metal film 40 at the right portion of the bumper 20 is deformed and the metal film 40 comes into contact with the resistance film 30.

When the metal film 40 and the resistance film 30 contact each other, the metal film 40, the resistance film 30 the multimeters (not shown) are connected, a voltage difference between the left ends and the right ends of the metal film 40 and the resistance film 30 occurs, and resistance values are measured based on the voltage difference.

Here, when the resistance value measured at the left side with respect to the portion of the bumper 20 which the obstacle W contacts, i.e., the first resistance value R1, and the resistance value measured at the right side with respect to the portion of the bumper 20 which the obstacle W contacts, i.e., the second resistance value R2, are compared, the sum total of the first resistance value R1 and the second resistance value R2 is equal to the overall resistance value R, i.e., 1, of the resistance film 30 and the first resistance value R1 is greater than the second resistance value R2.

If the sum total of the first resistance value R1 and the second resistance value R2 is equal to the overall resistance value R of the resistance film 30, i.e., 1, and the first resistance value R1 is greater than the second resistance value R2, as described above, it is recognized that the obstacle W contacts the right portion of the bumper 20 and thus the position of the obstacle W contacting the bumper 20 is detected.

Figure 8:
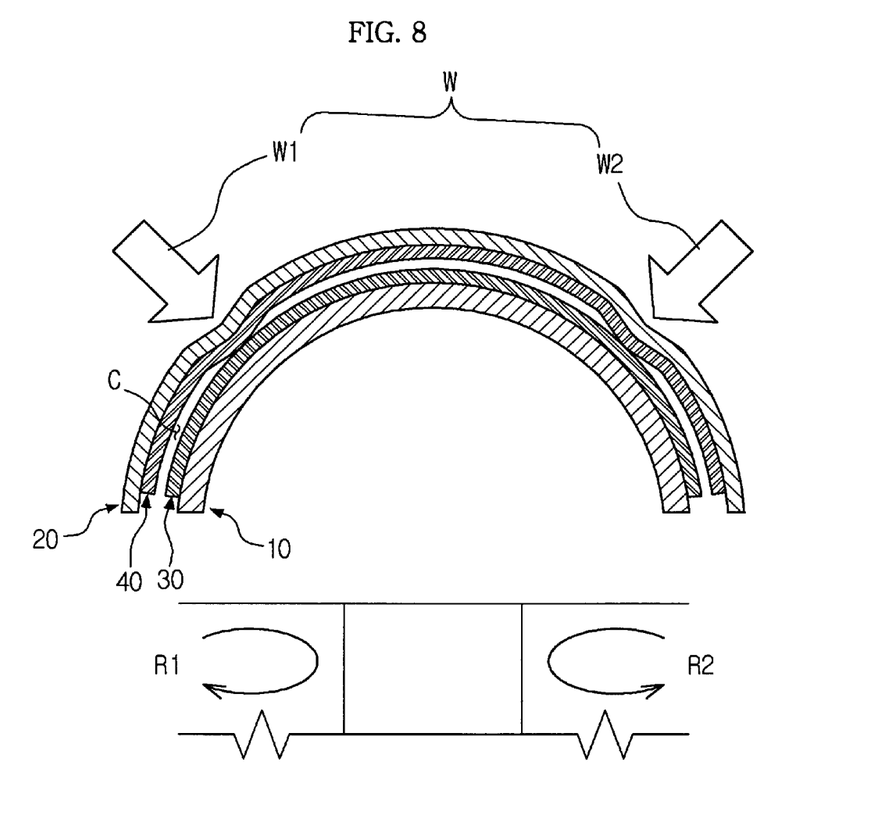

As shown in FIG. 8, when two obstacles W1 and W2 respectively contact the left portion and the right portion of the bumper 20, the shapes of the left and right portions of the bumper 20, which the obstacles W1 and W2 contact, are deformed and the shape of the metal film 40 fixed to the bumper 40 is deformed together with the left and right portions of the bumper 20.

The metal film 40 fixed to the bumper 20 and the resistance film 30 fixed to the main body 10 are separated from each other by the contact space S formed between the metal film 40 and the resistance film 30, and then, when the two obstacles W1 and W2 respectively contact the left and right portions of the bumper 20, the shape of the metal film 40 at the left and right portions of the bumper 20 is deformed and the metal film 40 comes into contact with the resistance film 30.

When the metal film 40 and the resistance film 30 contact each other, the metal film 40, the resistance film 30 and the multimeters (not shown) are connected, a voltage difference between the left ends and the right ends of the metal film 40 and the resistance film 30 occurs, and resistance values are measured based on the voltage difference.

Here, when the resistance value measured at the left side with respect to the left portion of the bumper 20 which the obstacle W1 contacts, i.e., the first resistance value R1, and the resistance value measured at the right side with respect to the right portion of the bumper 20 which the obstacle W2 contacts, i.e., the second resistance value R2, are measured, the sum total of the first resistance value R1 and the second resistance value R2 is less than the overall resistance value R, i.e., 1, of the resistance film 30 and both the first resistance value R1 and the second resistance value R2 are less than half the overall resistance value R of the resistance film 30, i.e., 0.5.

If the sum total of the first resistance value R1 and the second resistance value R2 is less than the overall resistance value R of the resistance film 30, i.e., 1, as described above, it is recognized that the two or more obstacles W1 and W2 contact the bumper 20, and if the sum total of the first resistance value R1 and the second resistance value R2 is less than the overall resistance value R of the resistance film 30, i.e., 1 and the both the first resistance value R1 and the second resistance value R2 are less than half the overall resistance value R of the resistance film 30, i.e., 0.5, it is recognized that the two obstacles W1 and W2 respectively contact the left and right portions with respect to the center of the bumper 20 and thus the positions of the obstacles W1 and W2 contacting the bumper 20 are detected.

Figure 9:
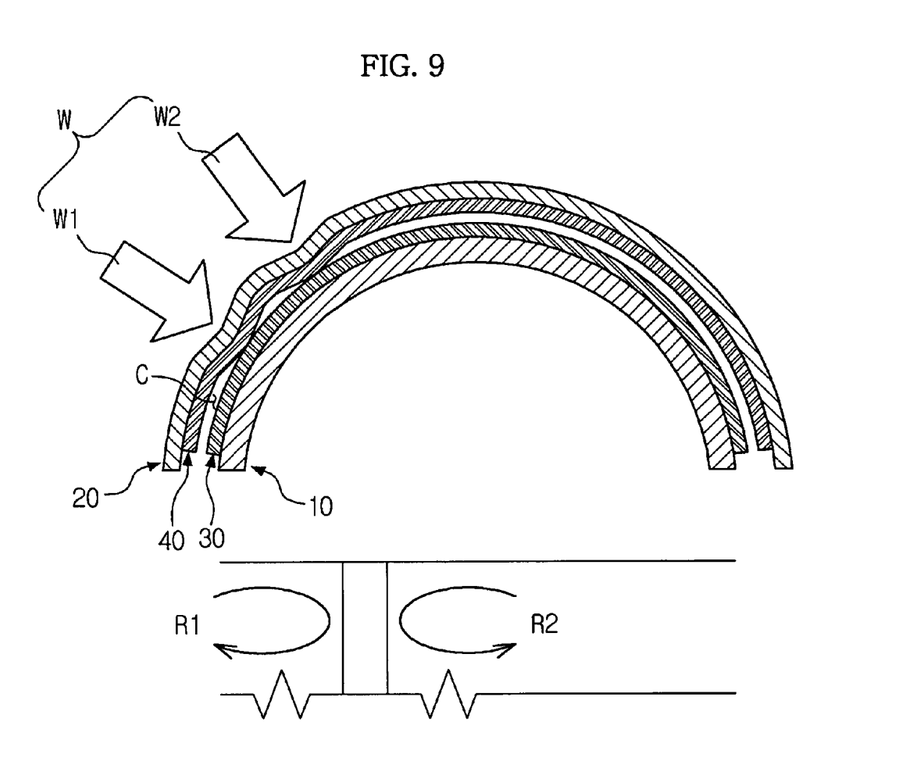

As shown in FIG. 9, when two obstacles W1 and W2 contact the left portion of the bumper 20, the shape of the left portion of the bumper 20, which the two obstacles W1 and W2 contact, is deformed and the shape of the metal film 40 fixed to the bumper 40 is deformed together with the left portion of the bumper 20.

The metal film 40 fixed to the bumper 20 and the resistance film 30 fixed to the main body 10 are separated from each other by the contact space S formed between the metal film 40 and the resistance film 30, and then, when the two obstacles W1 and W2 contact the left portion of the bumper 20, the shape of the metal film 40 at the left portion of the bumper 20 is deformed and the metal film 40 comes into contact with the resistance film 30.

When the metal film 40 and the resistance film 30 contact each other, the metal film 40, the resistance film 30 and the multimeters (not shown) are connected, a voltage difference between the left ends and the right ends of the metal film 40 and the resistance film 30 occurs, and resistance values are measured based on the voltage difference.

Here, when the resistance value measured at the left side with respect to the portion of the bumper 20 which the obstacle W1 of the two obstacles W1 and W2 closer to the left end of the bumper 20 contacts, i.e., the first resistance value R1, and the resistance value measured at the right side with respect to the obstacle W2 of the two obstacles W1 and W2 closer to the center of the bumper 20, i.e., the second resistance value R2, are measured, the sum total of the first resistance value R1 and the second resistance value R2 is less than the overall resistance value R, i.e., 1, of the resistance film 30, the first resistance value R1 is less than half the overall resistance value R of the resistance film 30, i.e., 0.5, and the second resistance value R2 is greater than half the overall resistance value R of the resistance film 30, i.e., 0.5.

If the sum total of the first resistance value R1 and the second resistance value R2 is less than the overall resistance value R of the resistance film 30, i.e., 1, as described above, it is recognized that the two or more obstacles W1 and W2 contact the bumper 20, and if the sum total of the first resistance value R1 and the second resistance value R2 is less than the overall resistance value R of the resistance film 30, i.e., 1, the first resistance value R1 is less than half the overall resistance value R of the resistance film 30, i.e., 0.5, and the second resistance value R2 is greater than half the overall resistance value R of the resistance film 30, i.e., 0.5, it is recognized that both the obstacles W1 and W2 contact the left portion with respect to the center of the bumper 20 and thus the positions of the obstacles W1 and W2 contacting the bumper 20 are detected.

Figure 10:
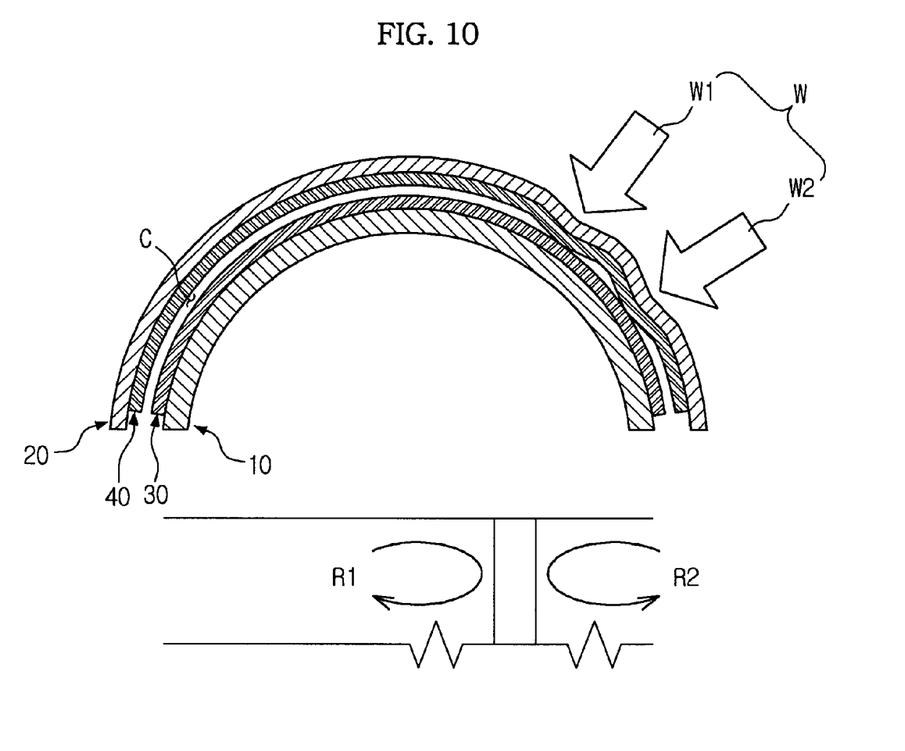

As shown in FIG. 10, when two obstacles W1 and W2 contact the right portion of the bumper 20, the shape of the right portion of the bumper 20, which the two obstacles W1 and W2 contact, is deformed and the shape of the metal film 40 fixed to the bumper 40 is deformed together with the right portion of the bumper 20.

The metal film 40 fixed to the bumper 20 and the resistance film 30 fixed to the main body 10 are separated from each other by the contact space S formed between the metal film 40 and the resistance film 30, and then, when the two obstacles W1 and W2 contact the right portion of the bumper 20, the shape of the metal film 40 at the right portion of the bumper 20 is deformed and the metal film 40 comes into contact with the resistance film 30.

When the metal film 40 and the resistance film 30 contact each other, the metal film 40, the resistance film 30 and the multimeters (not shown) are connected, a voltage difference between the left ends and the right ends of the metal film 40 and the resistance film 30 occurs, and resistance values are measured based on the voltage difference.

Here, when the resistance value measured at the left side with respect to the portion of the bumper 20 which the obstacle W1 of the two obstacles W1 and W2 closer to the center of the bumper 20 contacts, i.e., the first resistance value R1, and the resistance value measured at the right side with respect to the obstacle W2 of the two obstacles W1 and W2 closer to the right end of the bumper 20, i.e., the second resistance value R2, are measured, the sum total of the first resistance value R1 and the second resistance value R2 is less than the overall resistance value R, i.e., 1, of the resistance film 30, the first resistance value R1 is greater than half the overall resistance value R of the resistance film 30, i.e., 0.5, and the second resistance value R2 is less than half the overall resistance value R of the resistance film 30, i.e., 0.5.

If the sum total of the first resistance value R1 and the second resistance value R2 is less than the overall resistance value R of the resistance film 30, i.e., 1, as described above, it is recognized that the two or more obstacles W1 and W2 contact the bumper 20, and if the sum total of the first resistance value R1 and the second resistance value R2 is less than the overall resistance value R of the resistance film 30, i.e., 1, the first resistance value R1 is greater than half the overall resistance value R of the resistance film 30, i.e., 0.5, and the second resistance value R2 is less than half the overall resistance value R of the resistance film 30, i.e., 0.5, it is recognized that both the obstacles W1 and W2 contact the right portion with respect to the center of the bumper 20 and thus the positions of the obstacles W1 and W2 contacting the bumper 20 are detected.

Although the above embodiment mainly illustrates a specific shape and direction of the bumper structure of the cleaning robot, the shape and direction of the bumper structure may be variously modified and changed.

As is apparent from the above description, a cleaning robot having a bumper structure in accordance with one embodiment of the present disclosure may detect whether or not an obstacle contacts a bumper and a position of the obstacle using a resistance film and a metal film.

Further, the bumper may be simply processed and reduce the number of components of the cleaning robot to lower the production costs of the cleaning robot.

Although a few embodiments of the present disclosure have been shown and described, it would be appreciated by those skilled in the art that changes may be made in these embodiments without departing from the principles and spirit of the invention, the scope of which is defined in the claims and their equivalents.

What is claimed is:

1. A bumper structure of a cleaning robot comprising:
a main body;
a bumper installed on the front surface of the main body;
a resistance film provided between the main body and the bumper and fixed to the main body; and
a metal film provided between the main body and the bumper and fixed to the bumper such that the shape of the metal film is deformed together with the bumper and the metal film comes into contact with the resistance film when at least one obstacle contacts the bumper, so as to measure resistance values.

2. The bumper structure according to claim 1, wherein the bumper is made of a flexible material.

3. The bumper structure according to claim 2, wherein the bumper is attached to the main body through snap-fit connection.

4. The bumper structure according to claim 1, wherein the metal film is conductive.

5. The bumper structure according to claim 1, wherein the metal film is flexible.

6. The bumper structure according to claim 1, wherein the metal film comes into contact with the resistance film when the at least one obstacle contacts the bumper, so as to detect whether or not the at least one obstacle contacts the bumper and a position of the at least one obstacle.

* * * * *